United States Patent
Lin et al.

(10) Patent No.: US 12,256,403 B2
(45) Date of Patent: Mar. 18, 2025

(54) METHOD AND APPARATUS FOR TRANSMITTING FEEDBACK INFORMATION, METHOD AND APPARATUS FOR RECEIVING FEEDBACK INFORMATION, TERMINAL, AND MEDIUM

(71) Applicant: GUANGDONG OPPO MOBILE TELECOMMUNICATIONS CORP., LTD., Dongguan (CN)

(72) Inventors: Yanan Lin, Dongguan (CN); Zuomin Wu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 402 days.

(21) Appl. No.: 17/671,275

(22) Filed: Feb. 14, 2022

(65) Prior Publication Data

US 2022/0167390 A1    May 26, 2022

Related U.S. Application Data

(63) Continuation of application No. PCT/CN2019/116855, filed on Nov. 8, 2019.

(51) Int. Cl.
*H04W 72/23* (2023.01)
*H04W 72/1268* (2023.01)

(52) U.S. Cl.
CPC ....... *H04W 72/23* (2023.01); *H04W 72/1268* (2013.01)

(58) Field of Classification Search
CPC .................. H04W 72/23; H04W 72/1268
See application file for complete search history.

(56) References Cited

U.S. PATENT DOCUMENTS

| 2019/0103943 A1* | 4/2019 | Wang | H04L 1/1854 |
| 2022/0124690 A1* | 4/2022 | Lin | H04W 72/23 |
| 2022/0140953 A1* | 5/2022 | Lin | H04L 1/1812 370/329 |
| 2022/0167390 A1* | 5/2022 | Lin | H04L 1/1854 |

(Continued)

FOREIGN PATENT DOCUMENTS

| CN | 109639398 A | 4/2019 |
| CN | 109981227 A | 7/2019 |
| WO | 2019099569 A1 | 5/2019 |

OTHER PUBLICATIONS

First Office Action Dated Nov. 29, 2022 From the Chinese patent Application No. 202110882515.9.

(Continued)

*Primary Examiner* — Michael J Moore, Jr.
(74) *Attorney, Agent, or Firm* — BAYES PLLC

(57) ABSTRACT

A method for generating feedback information, applied to a terminal, includes receiving a first downlink control information, wherein a downlink physical channel scheduled by the first downlink control information is contained in a first channel group, and the first downlink control information is used to indicate the terminal to transmit a feedback information corresponding to two channel groups, and determining an order of the feedback information corresponding to the two channel groups in a feedback information codebook according to the first downlink control information.

12 Claims, 6 Drawing Sheets

(56) References Cited

U.S. PATENT DOCUMENTS

2022/0353019 A1* 11/2022 Li .................. H04L 1/1685
2022/0361211 A1* 11/2022 Karaki ............. H04L 1/1685

OTHER PUBLICATIONS

Qualcomm Incorparated: "Enhancements to Scheduling and HARQ operation for NR-U", 3GPP; R1-1909247, 7.2.2.2.3 , vol. RAN WG1 Meeting #98, Prague, Czech Republic; Aug. 26, 2019-Aug. 30, 2019, Aug. 17, 2019.
LG Electronics HARQ procedure for NR-U 3GPP TSF RAN WG1 #98bis R1-1910821 Oct. 20, 2019.
OPPO HARQ enhancements for NR-U 3GPP TSG RAN WG1 #97 R1-1906488 May 17, 2019.
Huawei Feature lead summary#3 of HARQ enhancements for NR-U 3GPP TSG RAN WG1 #98bis R1-1911697 Oct. 22, 2019.
International Search Report and the Written Opinion Dated Nov. 8, 2019 From the International Searching Authority Re. Application No. PCTCN2019116855.
Supplementary European Search Report issued in European Application No. 19952081.8, dated Jun. 30, 2022.
Qualcomm Incorparated: "Enhancements to Scheduling and HARQ operation for NR-U", R1-1911099, 3GPP TSG RAN WG1 Meeting #98bis, Oct. 14-Oct. 20, 2019.

* cited by examiner

METHOD AND APPARATUS FOR TRANSMITTING FEEDBACK INFORMATION, METHOD AND APPARATUS FOR RECEIVING FEEDBACK INFORMATION, TERMINAL, AND MEDIUM

CROSS REFERENCE TO RELATED APPLICATION

This application is a continuation of an International Application No. PCT/CN2019/116855, entitled "METHOD AND APPARATUS FOR TRANSMITTING FEEDBACK INFORMATION, METHOD AND APPARATUS FOR RECEIVING FEEDBACK INFORMATION, TERMINAL, AND MEDIUM", filed on Nov. 8, 2019, the contents of which are incorporated herein by reference in its entirety.

TECHNICAL FIELD

The embodiments of the present application relate to the field of mobile communication technology, and more specifically, to a method and an apparatus for transmitting feedback information, a method and an apparatus for receiving feedback information, a terminal, and a medium.

RELATED ART

In order to ensure reliability of communication transmission, it is necessary to provide feedback on a transmission situation. In mobile communication, a base station transmits downlink data to a terminal in a hybrid automatic repeat request (HARQ) manner. After receiving the downlink data transmitted through a certain HARQ process, the terminal needs to return HARQ feedback information to the base station. The HARQ feedback information is, for example, ACK (indicating correct reception) and NACK (indicating incorrect reception).

In the related technology, the terminal may support a group-based feedback mode, and the base station indicates information of a channel group to which a downlink physical channel scheduled by a DCI is contained in through the scheduling DCI. When the terminal is triggered to feed back a feedback information corresponding to a certain channel group, the terminal can feed back the feedback information corresponding to all downlink physical channels contained in the channel group to the base station together.

SUMMARY

The embodiments of the present application provide a method and an apparatus for transmitting feedback information, a method and an apparatus for receiving feedback information, a terminal, and a medium. The technical solution is as follows:

According to one aspect of the present application, a method for transmitting feedback information is provided, which is applied to a terminal, and the method includes:

receiving a first downlink control information, wherein the first downlink control information comprises information of a downlink physical channel corresponding to a first channel group, the first downlink control information does not comprise information of a downlink physical channel corresponding to a second channel group, the first channel group comprises a downlink physical channel scheduled by the first downlink control information or a downlink physical channel carrying the first downlink control information, and the second channel group comprises a downlink physical channel scheduled by a second downlink control information or a downlink physical channel carrying the second downlink control information; and when the terminal is triggered to transmit a feedback information corresponding to at least two channel groups, transmitting a feedback information codebook of a feedback information corresponding to all hybrid automatic repeat request (HARD) processes supported by the terminal, or the feedback information codebook comprising a feedback information corresponding to the first channel group.

According to one aspect of the present application, a method for receiving feedback information is provided, which is applied to an access network device, and the method includes:

transmitting a first downlink control information, wherein the first downlink control information comprises information of a downlink physical channel corresponding to a first channel group, the first downlink control information does not comprise information of a downlink physical channel corresponding to a second channel group, the first channel group comprises a downlink physical channel scheduled by the first downlink control information or a downlink physical channel carrying the first downlink control information, and the second channel group comprises a downlink physical channel scheduled by a second downlink control information or a downlink physical channel carrying the second downlink control information; and receiving a feedback information codebook, wherein the feedback information codebook is transmitted when a terminal is triggered to transmit a feedback information corresponding to at least two channel groups, the feedback codebook information comprises a feedback information corresponding to all hybrid automatic repeat request (HARD) processes supported by the terminal, or the feedback information codebook comprises a feedback information corresponding to the first channel group.

According to one aspect of the present application, a method for transmitting feedback information is provided, which is applied to a terminal, and the method includes:

receiving a first downlink control information, wherein the first downlink control information is used to schedule a first uplink physical channel, the first downlink control information comprises a first information, and the first information is used to indicate a number of downlink physical channels included in a target channel group;

receiving a second downlink control information, wherein the second downlink control information is used to indicate the terminal to transmit a feedback information corresponding to at least two channel groups, and the at least two channel groups comprise the target channel group; and transmitting the feedback information of the at least two channel groups, wherein a number of bits of a feedback information of the target channel group in the feedback information of the at least two channel groups is determined according to the first information.

According to one aspect of the present application, a method for receiving feedback information is provided, which is applied to an access network device, and the method includes:

transmitting a first downlink control information, wherein the first downlink control information is used to schedule a first uplink physical channel, the first downlink control information comprises a first information, and the first information is used to indicate a number of downlink physical channels included in a target channel group;

transmitting a second downlink control information, wherein the second downlink control information is used to indicate a terminal to transmit a feedback information corresponding to at least two channel groups, and the at least two channel groups comprise the target channel group; and receiving the feedback information of the at least two channel groups, wherein a number of bits of a feedback information of the target channel group in the feedback information of the at least two channel groups is determined according to the first information.

According to one aspect of the present application, a method for generating feedback information is provided, which is applied to a terminal, and the method includes:

receiving a first downlink control information, wherein a downlink physical channel scheduled by the first downlink control information or a channel carrying the first downlink control information is contained in a first channel group, and the first downlink control information is used to indicate the terminal to transmit a feedback information corresponding to two channel groups;

determining an order of the feedback information corresponding to the two channel groups according to the first downlink control information; and generating a feedback information codebook according to the order.

According to one aspect of the present application, a method for receiving feedback information is provided, which is applied to an access network device, and the method includes:

transmitting a first downlink control information, wherein a downlink physical channel scheduled by the first downlink control information or a channel carrying the first downlink control information is contained in a first channel group, and the first downlink control information is used to indicate a terminal to transmit a feedback information corresponding to two channel groups; and receiving a feedback information codebook, wherein an order of the feedback information in the feedback information codebook is determined by the terminal according to the first downlink control information.

According to one aspect of the present application, a method for transmitting feedback information is provided, which is applied to a terminal, and the method includes:

a receiver configured to receive a first downlink control information, wherein the first downlink control information comprises information of a downlink physical channel corresponding to a first channel group, the first downlink control information does not comprise information of a downlink physical channel corresponding to a second channel group, the first channel group comprises a downlink physical channel scheduled by the first downlink control information or a downlink physical channel carrying the first downlink control information, and the second channel group comprises a downlink physical channel scheduled by a second downlink control information or a downlink physical channel carrying the second downlink control information; and a transmitter, wherein when the terminal is triggered to transmit a feedback information corresponding to at least two channel groups, the transmitter transmits a feedback information codebook of a feedback information corresponding to all hybrid automatic repeat request (HARD) processes supported by the terminal, or the feedback information codebook comprises a feedback information corresponding to the first channel group.

According to one aspect of the present application, a device for receiving feedback information includes:

a transmitter configured to transmit a first downlink control information, wherein the first downlink control information comprises information of a downlink physical channel corresponding to a first channel group, the first downlink control information does not comprise information of a downlink physical channel corresponding to a second channel group, the first channel group comprises a downlink physical channel scheduled by the first downlink control information or a downlink physical channel carrying the first downlink control information, and the second channel group comprises a downlink physical channel scheduled by a second downlink control information or a downlink physical channel carrying the second downlink control information; and a receiver configured to receive a feedback information codebook, wherein the feedback information codebook is transmitted when a terminal is triggered to transmit a feedback information corresponding to at least two channel groups, the feedback codebook information comprises a feedback information corresponding to all hybrid automatic repeat request (HARD) processes supported by the terminal, or the feedback information codebook comprises a feedback information corresponding to the first channel group.

According to one aspect of the present application, a device for transmitting feedback information includes:

a receiver configured to receive a first downlink control information, wherein the first downlink control information is used to schedule a first uplink physical channel, the first downlink control information comprises a first information, and the first information is used to indicate a number of downlink physical channels included in a target channel group; and wherein the receiver is configured to receive a second downlink control information, the second downlink control information is used to indicate the terminal to transmit a feedback information corresponding to at least two channel groups, and the at least two channel groups comprise the target channel group; and a transmitter configured to transmit the feedback information of the at least two channel groups, wherein a number of bits of a feedback information of the target channel group in the feedback information of the at least two channel groups is determined according to the first information.

According to one aspect of the present application, a device for receiving feedback information includes:

a transmitter configured to transmit a first downlink control information, wherein the first downlink control information is used to schedule a first uplink physical channel, the first downlink control information comprises a first information, and the first information is used to indicate a number of downlink physical channels included in a target channel group; wherein the transmitter is configured to transmit a second downlink control information, the second downlink control information is used to indicate a terminal to transmit a feedback information corresponding to at least two channel groups, and the at least two channel groups comprise the target channel group; and a receiver configured to receive the feedback information of the at least two channel groups, wherein a number of bits of a feedback information of the target channel group in the feedback information of the at least two channel groups is determined according to the first information.

According to one aspect of the present application, a device for generating feedback information includes:

a receiver configured to receive a first downlink control information, wherein a downlink physical channel scheduled by the first downlink control information or a channel carrying the first downlink control information is contained in a first channel group, and the first downlink control information is used to indicate the terminal to transmit a feedback information corresponding to two channel groups;

a determination module configured to determine an order of the feedback information corresponding to the two channel groups according to the first downlink control information; and a generator configured to generate a feedback information codebook according to the order.

According to one aspect of the present application, a device for receiving feedback information includes:

a transmitter configured to transmit a first downlink control information, wherein a downlink physical channel scheduled by the first downlink control information or a channel carrying the first downlink control information is contained in a first channel group, and the first downlink control information is used to indicate a terminal to transmit a feedback information corresponding to two channel groups; and a receiver configured to receive a feedback information codebook, wherein an order of the feedback information in the feedback information codebook is determined by the terminal according to the first downlink control information.

According to one aspect of the present application, a terminal includes: a processor; a transceiver connected to the processor; and a memory configured to store an executable indication of the processor; wherein the processor is configured to load and execute the executable indication to perform the method for transmitting feedback information according to the above aspect, or to perform the method for generating feedback information according to the above aspect.

According to one aspect of the present application, an access network device includes: a processor; a transceiver connected to the processor; and a memory configured to store an executable indication of the processor; wherein the processor is configured to load and execute the executable indication to perform the method for receiving feedback information according to the above aspect.

According to one aspect of the present application, a computer-readable storage medium is provided, wherein an executable indication is stored in the computer-readable storage medium, and the executable indication is loaded and executed by a processor to perform the method for transmitting feedback information, the method for generating feedback information, or the method for receiving feedback information according to the above aspect.

The technical solutions provided by the embodiments of the present application include at least the following beneficial effects:

When a terminal is triggered to transmit a feedback information corresponding to at least two channel groups, if a first downlink control information does not include information of a downlink physical channel corresponding to a second channel group scheduled by a second downlink control information, that is, when information of the downlink physical channel corresponding to the channel group not scheduled by itself is not included, a transmitted feedback information codebook includes the feedback information corresponding to all hybrid automatic repeat request (HARD) processes supported by the terminal. Alternatively, the feedback information codebook includes the feedback information of the first channel group, so that it can be ensured that in the feedback information codebook sent by the terminal to the access network device, a correspondence between an ACK/NACK information and the downlink physical channel is consistent with what the access network device expects, so that the access network device can correctly demodulate the feedback information sent by the terminal, ensure reliability of an uplink control information, and improve a transmission efficiency of a system.

BRIEF DESCRIPTION OF THE DRAWINGS

In order to illustrate the technical solutions more clearly in the embodiments of the present application, the following will briefly introduce the drawings that need to be used in the description of the embodiments. Obviously, the drawings in the following description are only some embodiments of the present application. For those of ordinary skill in the art, other drawings can be obtained based on these drawings without creative work.

DETAILED DESCRIPTION OF ILLUSTRATED EMBODIMENTS

Figure 1:
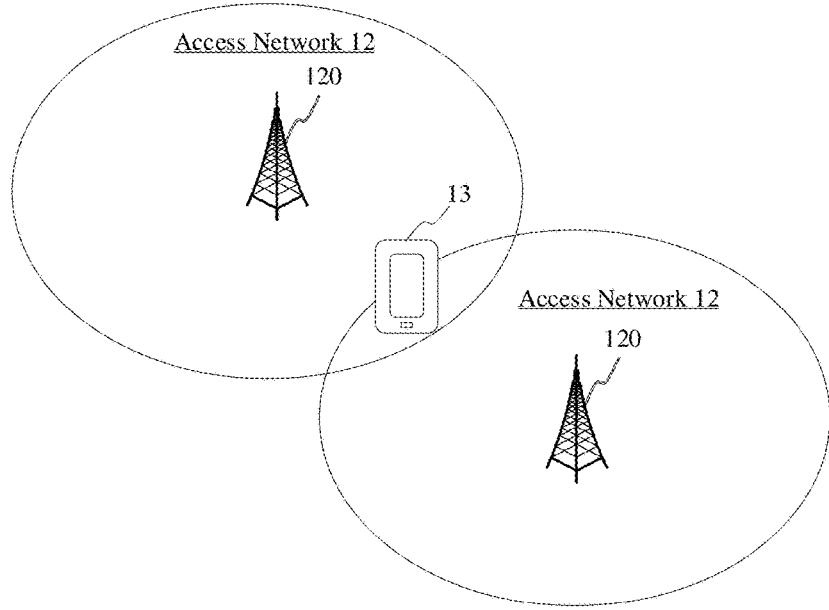
FIG. 1 is a schematic diagram of a feedback process based on a feedback group in related technologies.

In order to make objectives, technical solutions, and advantages of the present application clearer, implementation manners of the present application will be further described in detail below in conjunction with the accompanying drawings.

First, briefly introduce terms involved in embodiments of the present application:

Hybrid automatic repeat request (HARQ): It is a technology that combines forward error correction (FEC) and automatic repeat request (ARQ). Use the FEC technology at a receiving end to correct a correctable part of all errors. It is determined by error detection that a wrong data packet cannot be corrected. Discard a data packet that cannot be corrected and request a transmitter to resend the same data packet.

Full-process feedback mode: In a HARQ process-based feedback mode, a terminal supports a maximum of N HARQ processes. When the terminal performs the full-process feedback, no matter the terminal actually receives data transmitted by multiple HARQ processes, it always feeds back an ACK/NACK feedback information corresponding to N processes to an access network device. The ACK/NACK feedback information can be mapped to a feedback information codebook (codebook) in an order of an identification (or number) of the HARQ process. The ACK/NACK feedback information corresponding to an unreceived HARQ process is set as an occupancy information (such as NACK).

For example, assuming that the terminal supports a maximum of 8 HARQ processes, one HARQ process is transmitted through one physical channel at a time, and each HARQ process corresponds to an independent ACK/NACK feedback information. The terminal receives HARQ process 3, HARQ7, and HARQ4. When the access network device triggers the terminal to perform the full-process feedback, the terminal transmits a feedback {NACK, NACK, NACK, bHARQ3, bHARQ4, NACK, NACK, bHARQ7} in a PUCCH, where bHARQi represents the ACK/NACK feedback information corresponding to HARQ process i. The ACK/NACK feedback information corresponding to HARQ process 0, HARQ process 1, HARQ process 2, HARQ process 5, and HARQ process 6 not received by the terminal is set as an occupancy information NACK.

Feedback mode based on a feedback group: When the access network device triggers the terminal to perform a feedback group-based process feedback, the access network device indicates a specified channel group that needs to be fed back, and the terminal reports the ACK/NACK feedback information corresponding to the HARQ process in a designated channel group to the access network device.

Feedback mode based on at least two feedback groups: When the access network device triggers the terminal to perform the feedback mode based on at least two feedback groups, the terminal simultaneously reports the ACK/NACK feedback information corresponding to the physical downlink physical channels in the two channel groups to the access network device. In each channel group, a downlink allocation index of a physical downlink physical channel is independently counted. When the terminal performs the feedback mode based on at least two feedback groups, the ACK/NACK feedback information is mapped in the order of the channel groups, and in each channel group, the ACK/NACK feedback information is mapped in the order of a downlink assignment index (DAI).

In order to avoid inconsistent understanding of the feedback information between the terminal and the access network device, a new feedback information (NFI) can be carried in a downlink control information (DCI). NFI is used to indicate that ACK/NACK in the group corresponding to a physical downlink shared channel (PDSCH) scheduled by the DCI or a physical downlink control channel (PDCCH) carrying the DCI is cleared. NFI adopts a bit flipping working mode, for example, as illustrated in FIG. 1, after the ACK/NACK of three DCIS corresponding to the NFI of 0 in a channel group 0 are successfully fed back through the PUCCH, the access network device can set the NFI to 1 when subsequently scheduling the channel group 0 and identify the channel group 0 to restart the organization, that is, the ACK/NACK information corresponding to the previous NFI of 0 is released.

In the related art, when the terminal supports a feedback mode based on a feedback group, the terminal may also support a feedback mode based on at least two feedback groups. That is, the terminal supports transmitting feedback information of at least two channel groups to the access network device at the same time. However, a DCI usually includes a DAI information and NFI corresponding to the channel group where the PDSCH scheduled by the DCI is located, but does not necessarily include the DAI information and NFI corresponding to the channel group that does not contain in the DCI scheduling. When the feedback of ACK/NACK feedback information of two channel groups is triggered at the same time, the ACK/NACK feedback information is first mapped in the order of the channel group, and the ACK/NACK feedback information is mapped in the order of DAI in each channel group. If the DCI does not include the DAI information and NFI corresponding to the channel group that does not contain in the DCI scheduling, when the access network device triggers the terminal to transmit the ACK/NACK feedback information corresponding to the two channel groups at the same time, there will be ambiguities in understanding the feedback information between the access network device and the terminal, which seriously affects reliability of the feedback information.

Figure 2:
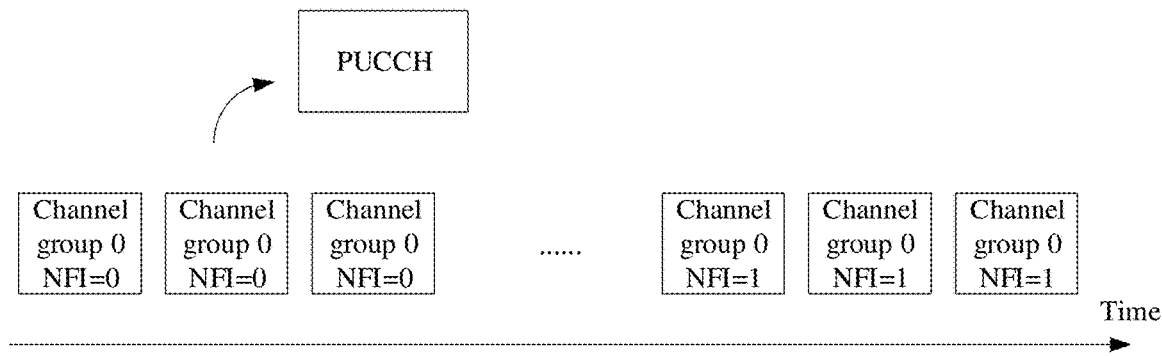
FIG. 2 is a schematic diagram of a feedback process based on two feedback groups in related technologies.

For example, as illustrated in FIG. 2, the access network device first schedules the channel group 0, the corresponding NFI is 0, and then schedules the channel group 0 again, the corresponding NFI is reversed to 1, and the terminal does not receive the channel group 0 scheduled again. The access network device triggers the ACK/NACK feedback information corresponding to the channel group 0 and a channel group 1 of the terminal through the DCI corresponding to the PDSCH in the channel group 1, but there is no NFI and DAI of the channel group 0 in the DCI. In other words, the terminal does not receive the flipped NFI of the channel group 0, therefore, the terminal can feed back the received ACK/NACK feedback information (5 bits in total) corresponding to the channel group 0 and the ACK/NACK information corresponding to the channel group 1 (5 bits in total), a total of 10 bits of information. From the perspective of the access network device, the access network device expects to receive the ACK/NACK information corresponding to the latest transmitted data, that is, the access network device expects to receive the ACK/NACK information (2 bits) corresponding to the channel group 0 and the ACK/NACK information (5 bits) corresponding to the channel group 1 for the second time. The access network device and the terminal have completely different understandings of the feedback corresponding relationship between the total number of bits of the ACK/NACK information and the physical channel, resulting in the access network device being unable to correctly demodulate the feedback information sent by the terminal, which affects a system performance.

Therefore, in the embodiments of the present disclosure, when the terminal performs ACK/NACK feedback information based on at least two channel groups, if the DCI does not include the DAI and NFI corresponding to the channel group that does not contain in the DCI scheduling, the full-process feedback method is adopted, or only the feedback information corresponding to the channel group scheduled by the DCI is fed back, thereby avoiding the above-mentioned ambiguity in understanding.

Figure 3:
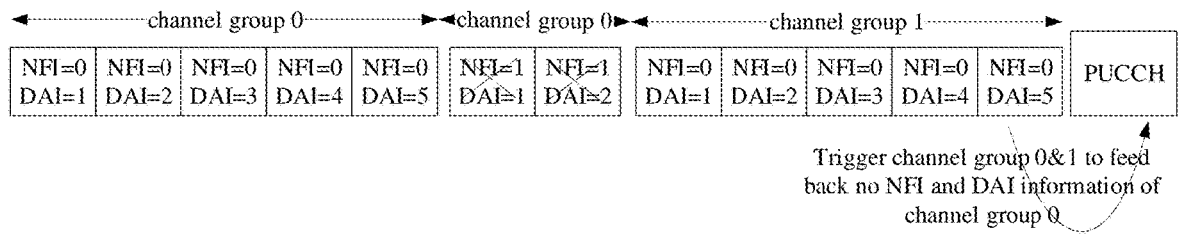
FIG. 3 is a block diagram of a communication system provided by an exemplary embodiment of the present application.

FIG. 3 illustrates a block diagram of a communication system provided by an exemplary embodiment of the present application. The communication system may include: an access network 12 and a terminal 13.

The access network 12 schedules a HARQ process to transmit data, and the terminal 13 performs information feedback on the HARQ process.

The access network 12 includes several access network devices 120. The access network device 120 may be a base station, which is a device deployed in an access network to provide a wireless communication function for a terminal. The base station may include various forms of macro base stations, micro base stations, relay stations, access points, and so on. In systems using different wireless access technologies, the names of devices with base station functions may be different. For example, in LTE systems, they are called eNodeB or eNB. In 5G NR-U systems, they are called gNodeB or gNB. As communication technology evolves, the description of "base station" may change. For convenience, in the embodiments of the present application, the above-mentioned devices that provide wireless communication functions for the terminal 13 are collectively referred to as access network devices.

The terminal 13 may include various handheld devices with wireless communication functions, vehicle-mounted devices, wearable devices, computing devices or other processing devices connected to a wireless modem, as well as various forms of user equipment, mobile stations (MS), terminal devices and so on. For ease of description, the devices mentioned above are collectively referred to as terminals. The access network device 120 and the terminal 13 communicate with each other through a certain air interface technology, such as a Uu interface.

Figure 4:
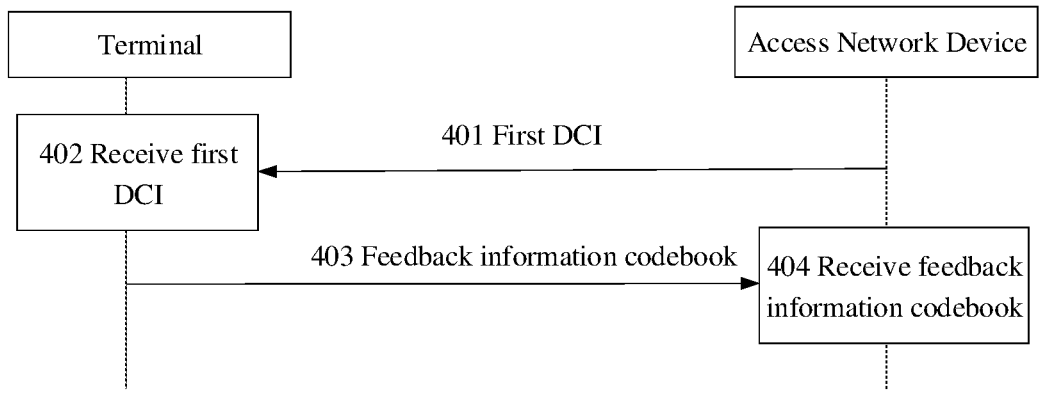
FIG. 4 is a flowchart of a transmission feedback information provided by an exemplary embodiment of the present application.

FIG. 4 illustrates a flowchart of a method for transmitting feedback information provided by an exemplary embodiment of the present application, which is applied to the terminal and the access network device as illustrated in FIG. 2, and the method includes:

401: The access network device transmits a first DCI.

The first DCI includes information of a downlink physical channel corresponding to a first channel group, and the first DCI does not include information of a downlink physical channel corresponding to a second channel group. The first channel group includes a physical channel scheduled by the first DCI (i.e., PDSCH) or a downlink physical channel that carries the first DCI (i.e., PDCCH), and the second channel group includes a downlink physical channel scheduled by a second DCI or a downlink physical channel that carries the second DCI.

Exemplarily, the information of the downlink physical channel includes NFI and/or DAI information.

In the embodiments of the present disclosure, the channel group may also be referred to as a feedback group.

402: The terminal receives the first DCI.

403: When the terminal is triggered to transmit feedback information corresponding to at least two channel groups, the terminal transmits a feedback information codebook.

The feedback information codebook includes the feedback information corresponding to all HARQ processes supported by the terminal, that is, the terminal adopts a full-process feedback mode. Alternatively, the feedback information codebook includes the feedback information corresponding to a first channel group, that is, the terminal generates the feedback information codebook corresponding to the first channel group according to NFI and DAI information in the first DCI.

404: The access network device receives the feedback information codebook.

When a terminal is triggered to transmit a feedback information corresponding to at least two channel groups, if a first downlink control information does not include information of a downlink physical channel corresponding to a second channel group scheduled by a second downlink control information, that is, when information of the downlink physical channel corresponding to the channel group not scheduled by itself is not included, a transmitted feedback information codebook includes the feedback information corresponding to all hybrid automatic repeat request (HARQ) processes supported by the terminal. Alternatively, the feedback information codebook includes the feedback information of the first channel group, so that it can be ensured that in the feedback information codebook sent by the terminal to the access network device, a correspondence between an ACK/NACK information and the downlink physical channel is consistent with what the access network device expects, so that the access network device can correctly demodulate the feedback information sent by the terminal, ensure reliability of an uplink control information, and improve a transmission efficiency of a system.

Figure 5:
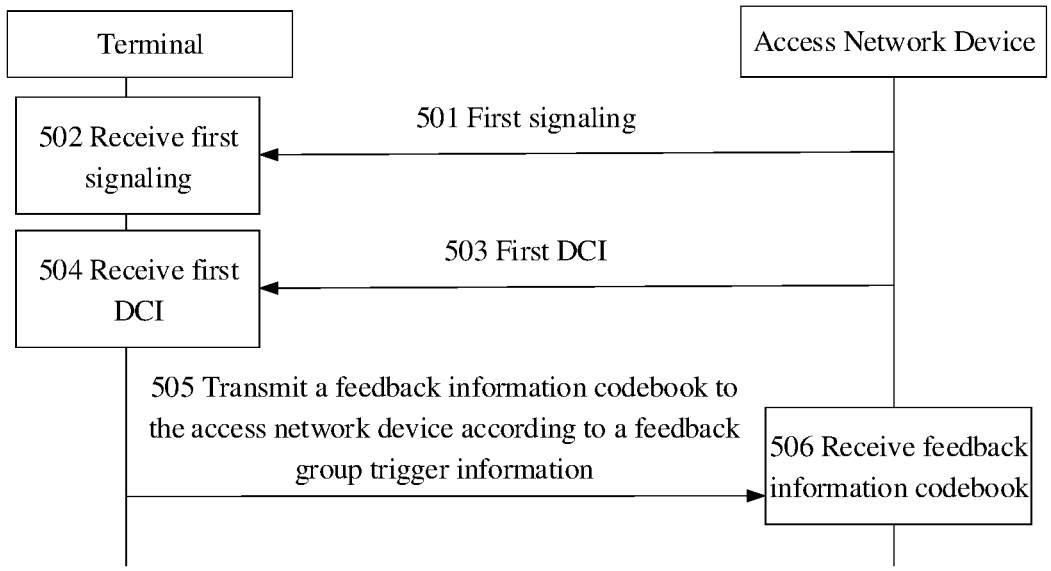
FIG. 5 is a flowchart of a transmission feedback information provided by an exemplary embodiment of the present application.

FIG. 5 illustrates a flowchart of a method for transmitting feedback information provided by an exemplary embodiment of the present application, which is applied to the terminal and the access network device as illustrated in FIG. 2. The difference from the embodiment illustrated in FIG. 4 is that, in the embodiment illustrated in FIG. 5, the access network device configures the terminal through a first signaling to support sending feedback information corresponding to at least two channel groups triggered by one DCI. As illustrated in FIG. 5, the method includes:

501: The access network device transmits the first signaling.

The first signaling is used to configure the terminal to support sending feedback information corresponding to at least two channel groups triggered by one DCI. That is, when the terminal receives the first signaling, the terminal supports the triggering of sending feedback information corresponding to at least two channel groups through a feedback group trigger information in one DCI. If the terminal does not receive the first signaling, the terminal does not support sending feedback information corresponding to at least two channel groups through one DCI trigger. For example, the terminal may support a feedback mode based on a feedback group or not support a feedback mode based on a feedback group.

In a possible implementation manner, the first signaling is used to indicate that the feedback group trigger information is included in the first DCI, and the feedback group trigger information is used to indicate the terminal to send feedback information corresponding to at least one channel group.

Optionally, the first signaling may also be used to indicate whether the NFI corresponding to the second channel group is included in the first DCI. The second channel group is contained in the aforementioned at least two channel groups, and the second channel group is a downlink physical channel group scheduled by the second DCI or a downlink physical channel group carrying the second DCI.

In another possible implementation manner, the first signaling is used to indicate that the first DCI includes the information of the downlink physical channel corresponding to the second channel group. In this way, the terminal is configured to support sending feedback information corresponding to at least two channel groups triggered by one DCI.

In another possible implementation manner, the first signaling is used to indicate that the first DCI does not include the information of the downlink physical channel corresponding to the second channel group. In this way, the terminal is configured to support sending feedback information corresponding to at least two channel groups triggered by one DCI.

Optionally, the first signaling may be a high layer signaling, such as a radio resource control (RRC) signaling.

502: The terminal receives the first signaling.

503: The access network device transmits the first DCI.

The first DCI includes the information of the downlink physical channel corresponding to the first channel group, and the first DCI does not include the information of the downlink physical channel corresponding to the second channel group. The first channel group includes the downlink physical channel group scheduled by the first DCI or the downlink physical channel group carrying the first DCI, and the second channel group includes the downlink physical channel group scheduled by the second DCI or the downlink physical channel group carrying the second DCI.

In this embodiment, the first DCI further includes a feedback group trigger information, and the feedback group trigger information is used to indicate the terminal to send feedback information corresponding to at least one channel group. Optionally, the feedback group trigger information includes a first trigger information or a second trigger information, the first trigger information is used to trigger the terminal to feed back feedback information corresponding to at least two channel groups, and the second trigger information is used to trigger the terminal to feed back the feedback information corresponding to the first channel group, and at least two channel groups include the first channel group.

504: The terminal receives the first DCI.

505: The terminal transmits the feedback information codebook to the access network device according to the feedback group trigger information.

When the feedback group trigger information carried by the first DCI is the first trigger information, the first feedback information codebook is sent to the access network device, and the first feedback information codebook includes feedback information corresponding to all HARQ processes supported by the terminal. That is, the terminal sends feedback information to the access network device in a full-process feedback mode.

When the feedback group trigger information carried by the second downlink control information includes the second trigger information, the second feedback information codebook is sent to the access network device, and the second feedback information codebook includes the feedback information corresponding to the first channel group. That is, the terminal uses a feedback method based on feedback group feedback to send feedback information to the access network device.

506: The access network device receives the feedback information codebook.

Optionally, this step 506 includes that: the access network device obtains a data feedback situation of each HARQ process through the received first feedback information codebook and determines whether to retransmit the data or transmit new data. Alternatively, the access network device obtains a data feedback situation of the HARQ process corresponding to the first channel group through the received second feedback information codebook and determines whether to retransmit the data or transmit new data.

Optionally, the method may further include receiving a second signaling, wherein the second signaling is used to configure the terminal to support sending feedback information in a channel group-based manner. The second signaling is similar to a mode switch. After receiving the second signaling, a second terminal is in a mode that supports sending feedback information in a channel group-based feedback manner. If the terminal does not receive the second signaling, the terminal is in a mode that does not support the channel group-based feedback mode to send feedback information.

In some embodiments, it is also possible that the terminal is in a mode that supports sending feedback information in a channel group-based feedback mode by default.

It should be noted that in some embodiments, only the second signaling may be included, but the first signaling may not be included. That is, as long as the terminal is in a mode that supports sending feedback information in a channel group-based feedback mode, it is assumed that the terminal supports sending feedback information corresponding to at least two channel groups triggered by one DCI.

In other embodiments, neither the second signaling nor the first signaling may be included. That is, by default, the terminal supports sending feedback information corresponding to at least two channel groups triggered by one DCI.

When a terminal is triggered to transmit a feedback information corresponding to at least two channel groups, if a first downlink control information does not include information of a downlink physical channel corresponding to a second channel group scheduled by a second downlink control information, that is, when information of the downlink physical channel corresponding to the channel group not scheduled by itself is not included, a transmitted feedback information codebook includes the feedback information corresponding to all hybrid automatic repeat request (HARQ) processes supported by the terminal. Alternatively, the feedback information codebook includes the feedback information of the first channel group, so that it can be ensured that in the feedback information codebook sent by the terminal to the access network device, a correspondence between an ACK/NACK information and the downlink physical channel is consistent with what the access network device expects, so that the access network device can correctly demodulate the feedback information sent by the terminal, ensure reliability of an uplink control information, and improve a transmission efficiency of a system.

Figure 6:
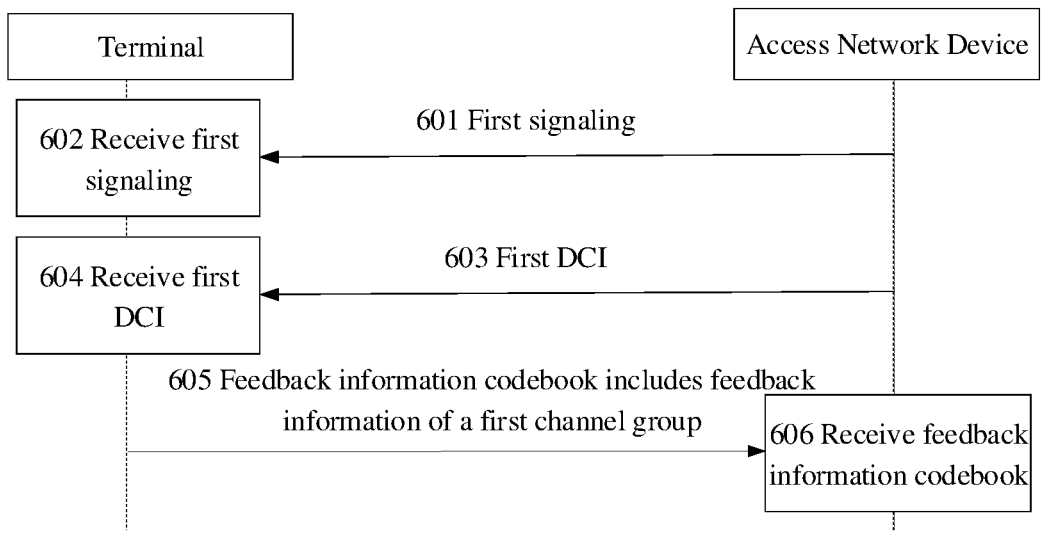
FIG. 6 is a flowchart of a transmission feedback information provided by an exemplary embodiment of the present application.

FIG. 6 illustrates a flowchart of a method for transmitting feedback information provided by an exemplary embodiment of the present application, which is applied to the terminal and access network device as illustrated in FIG. 2 and differs from the embodiment as illustrated in FIG. 5 in that: In the embodiment as illustrated in FIG. 6, the terminal is configured through the first signaling to not support the transmission of feedback information corresponding to at least two channel groups triggered by one DCI. As illustrated in FIG. 6, the method includes:

601: The access network device transmits a first signaling.

The first signaling is used to indicate that the terminal does not support sending feedback information corresponding to at least two channel groups triggered by one DCI.

Exemplarily, the first signaling is used to indicate that a feedback group trigger information is not included in a first DCI, and the feedback group trigger information is used to indicate the terminal to send feedback information of at least one channel group.

Optionally, the first signaling may also be used to indicate that a first downlink control information includes information of a downlink physical channel corresponding to a second channel group, and at least two channel groups include a second channel group.

602: The terminal receives the first signaling.

603: The access network device transmits the first DCI.

The first DCI includes the feedback group trigger information, and the feedback group trigger information may be a first trigger information or a second trigger information. For related descriptions of the first trigger information and the second trigger information, refer to step 503, and detailed descriptions are omitted here.

604: The terminal receives the first DCI.

605: The terminal transmits a feedback information codebook to the access network device, wherein the feedback information codebook includes a feedback information of the first channel group.

606: The access network device receives the feedback information codebook.

The access network device obtains a data feedback situation of a HARQ process corresponding to the first channel group through the received feedback information codebook and determines whether to retransmit the data or transmit new data.

When the terminal is configured through the first signaling to not support sending feedback information corresponding to at least two channel groups triggered by one DCI, even if the feedback group trigger information is carried in the first DCI, the terminal only feeds back the corresponding channel group to the access network device in order to ensure that the corresponding relationship between ACK/NACK information and the downlink physical channel in the feedback information codebook sent by the terminal to the access network device is consistent with what the access network device expects, so that the access network device can correctly demodulate the feedback information sent by the terminal, ensure reliability of an uplink control information, and improve a transmission efficiency of a system.

Figure 7:
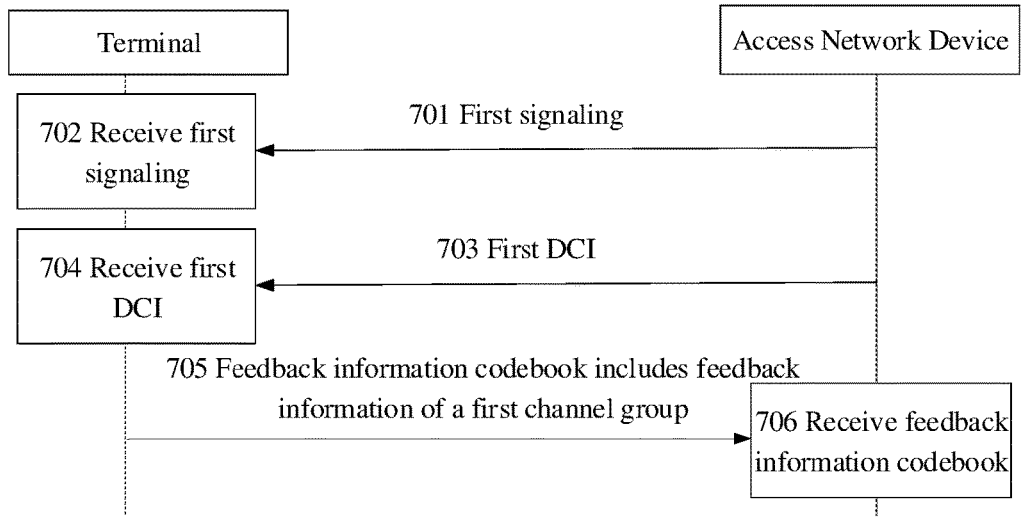
FIG. 7 is a flowchart of a transmission feedback information provided by an exemplary embodiment of the present application.

FIG. 7 illustrates a flowchart of a method for transmitting feedback information provided by an exemplary embodiment of the present application, which is applied to the terminal and the access network device as illustrated in FIG. 2, and the difference from the embodiment as illustrated in FIG. 5 is that: In the embodiment as illustrated in FIG. 7, the feedback group trigger information is not included in the first DCI. As illustrated in FIG. 7, the method includes:

701: The access network device transmits a first signaling.

For related content of the first signaling, refer to step 501, and detailed description is omitted here.

702: The terminal receives the first signaling.

703: The access network device transmits a first DCI.

The first DCI does not include a feedback group trigger information.

In a possible implementation manner, the first DCI includes a feedback group trigger information field, and the feedback group trigger information field is reserved (for example, carrying invalid data). Alternatively, the feedback group trigger information field is used to carry a non-feedback group trigger information.

The non-feedback group trigger information refers to information other than the feedback group trigger information. In a possible implementation manner, the non-feedback group trigger information includes but is not limited to a physical channel priority information, a coding level adjustment table information, a code block group (CBG) information, etc. In another possible implementation manner, the non-feedback group trigger information is information carried in other information field except the feedback group trigger information field in the first DCI. That is, it is combined with other information field in the first DCI to expand an indication range of the other information fields.

For example, the other information field is a DAI information field, the DAI information field is 2 bits, and the feedback group trigger information field is 1 bit. The DAI information field is combined with the feedback group trigger information field, so that the DAI information field is expanded to 3 bits to indicate the DAI information.

In another possible implementation manner, the first DCI does not include the feedback group trigger information field.

704: The terminal receives a first DCI.

705: The terminal transmits a feedback information codebook to the access network device, and the feedback information codebook includes a feedback information of a first channel group.

706: The access network device receives the feedback information codebook.

The access network device obtains a data feedback situation of a HARQ process corresponding to the first channel group through the received feedback information codebook and determines whether to retransmit the data or transmit new data.

Optionally, the method may further include receiving a second signaling, and the second signaling is used to configure the terminal to support sending feedback information in a channel group-based manner. For the detailed content of the second signaling, refer to the embodiment as illustrated in FIG. 5, and detailed description is omitted here.

When the terminal is configured through the first signaling to support sending feedback information corresponding to at least two channel groups triggered by one DCI, if the feedback group trigger information is not included in the first DCI, the terminal only feeds back the feedback information corresponding to the first channel group to the access network device to ensure that the corresponding relationship between the ACK/NACK information and the downlink physical channel in the feedback information codebook sent by the terminal to the access network device is consistent with what the access network device expects. This enables the access network device to correctly demodulate the feedback information sent by the terminal, to ensure the reliability of the uplink control information, and to improve the transmission efficiency of the system.

Figure 8:
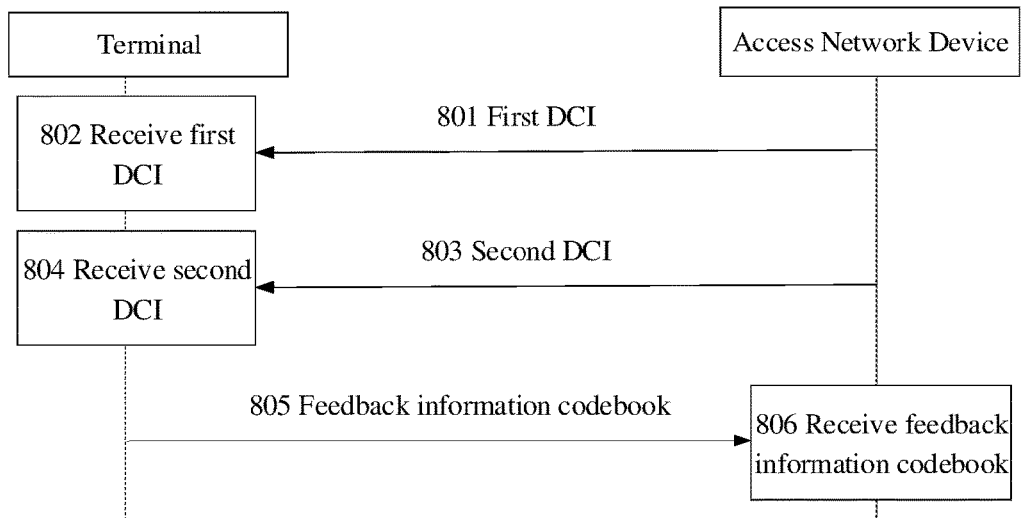
FIG. 8 is a flowchart of a transmission feedback information provided by an exemplary embodiment of the present application.

FIG. 8 illustrates a flowchart of a method for transmitting feedback information provided by an exemplary embodiment of the present application, which is applied to the terminal and access network device as illustrated in FIG. 2. As illustrated in FIG. 8, the method includes:

801: The access network device transmits the first DCI.

The first DCI is used to schedule the first uplink physical channel, that is, the first DCI carries uplink grant information (UL grant, uplink grant). The first DCI includes a first information, and the first information is used to indicate the number of downlink physical channels included in a target channel group. Exemplarily, the first information may be DAI information.

802: The terminal receives the first DCI.

803: The access network device transmits a second DCI.

The second DCI is used to indicate the terminal to transmit feedback information corresponding to at least two channel groups, and the at least two channel groups include the target channel group.

804: The terminal receives the second DCI.

805: The terminal transmits a feedback information of at least two channel groups.

The number of bits of the feedback information of the target channel group in the feedback information of the at least two channel groups is determined according to the first information, for example, may be the same as the number indicated by the first information.

The terminal can send the feedback information of the at least two channel groups in the form of the feedback information codebook.

806: The access network device receives feedback information of at least two channel groups.

Optionally, the first uplink physical channel may be a physical uplink control channel (PUCCH) or a physical uplink shared channel (PUSCH). In a possible embodiment, if the uplink scheduling information in the first DCI schedules a PUSCH transmission, and transmission resources of the PUSCH overlap with the PUCCH, the feedback information originally transmitted through the PUCCH may be carried on the PUSCH for transmission.

In a possible implementation manner, if the downlink physical channel scheduled by the second DCI or the downlink physical channel carrying the second DCI is contained in the second channel group, the second DCI includes the downlink physical channel used to indicate the downlink physical channel included in the first channel group. According to the second information about the number of channels, the target channel group is the second channel group. Exemplarily, the second information may be DAI information.

Figure 9:
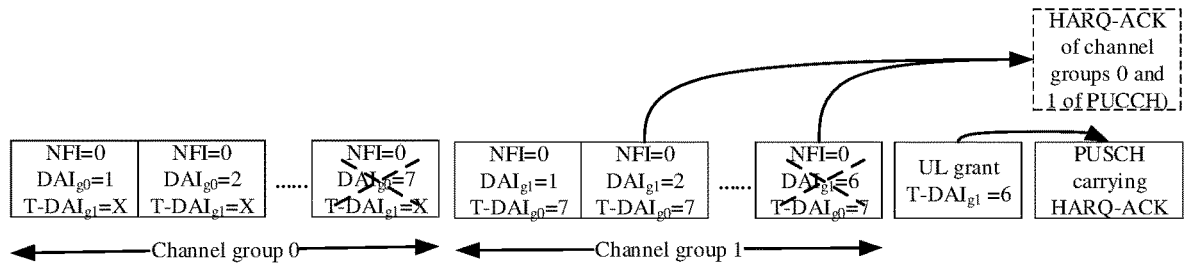
FIG. 9 is a schematic diagram of a feedback process of a feedback information provided by an exemplary embodiment of the present application.

As illustrated in FIG. 9, the terminal supports simultaneous feedback of two channel groups, which are channel group 0 and channel group 1, respectively. The channel group 0 is scheduled by the first DCI, the channel group 1 is scheduled by the second DCI, and the second DCI triggers the terminal to send feedback information corresponding to the channel group 0 and the channel group 1 through the PUCCH. The terminal obtains the first information from the first DCI, and the first information is used to indicate the number of downlink physical channels of the target channel group.

The second DCI contains two DAI information fields, which are used to indicate the number of downlink physical channels in the channel group 0 and the channel group 1, respectively.

For example, a DAI information field of the second DCI in FIG. 9 is used to indicate the number of downlink physical channels in the channel group 1, and T-DAI is used to indicate the number of downlink physical channels in the channel group 0. The first information in the first DCI is used to indicate the number of downlink physical channels included in the channel group 1.

In this way, because the DAI information is cumulatively counted, that is, every time data transmitted on a downlink physical channel is received, DAI is increased by 1, and the DAI corresponding to the data transmitted on the downlink physical channel received last time can correctly represent an actual scheduling situation. When the terminal does not receive the data transmitted by some downlink physical channels in the channel group 1, for example, the data transmitted by the downlink physical channel with DAI=6 in the channel group 1, the terminal and the access network device have inconsistent understanding of the number of downlink physical channels included in the channel group 1, resulting in inconsistent understanding of the number of feedback information bits corresponding to the channel group 1 in the feedback information codebook. The terminal determines the number of downlink physical channels in the second channel group (i.e., channel group 1) through the first information and determines the number of bits of feedback information corresponding to the channel group 1 in the feedback information codebook according to the number indicated by the first information, thereby ensuring that the terminal and the access network device have the same understanding of the number of downlink physical channels included in the channel group 1.

As illustrated in FIG. 9, the terminal schedules the PUSCH transmission based on the first DCI. Since the transmission resource of the PUSCH overlaps the transmission resource of the PUCCH, the feedback information originally transmitted through the PUCCH is carried in the PUSCH for transmission.

In another possible implementation manner, if the downlink physical channel used by the second DCI for scheduling or the downlink physical channel carrying the second DCI is contained in the second channel group, the second DCI does not include the second information for indicating the number of downlink physical channels included in the first channel group, and the target channel group is the first channel group.

Figure 10:
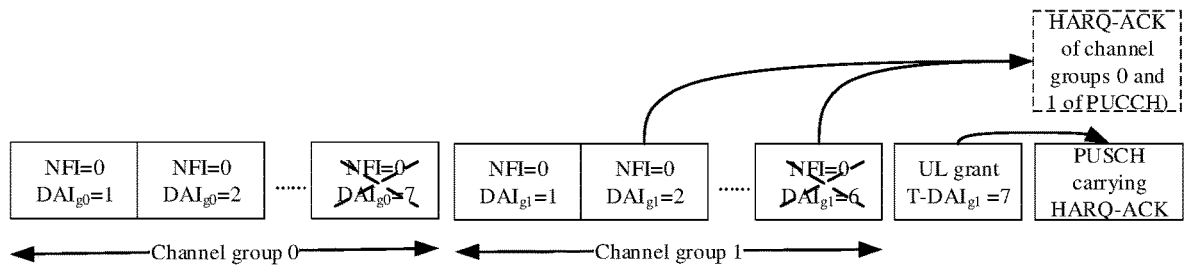
FIG. 10 is a schematic diagram of a feedback process of a feedback information provided by an exemplary embodiment of the present application.

As illustrated in FIG. 10, the terminal supports simultaneous feedback of two channel groups, which are the channel group 0 and the channel group 1, respectively. The channel group 0 is scheduled by the first DCI, the channel group 1 is scheduled by the second DCI, and the second DCI triggers the terminal to send feedback information corresponding to the channel group 0 and the channel group 1 through PUCCH. The terminal obtains the first information from the first DCI, and the first information is used to indicate the number of downlink physical channels of the target channel group.

The second DCI contains a DAI information field, which is used to indicate the number of downlink physical channels in the channel group 1, that is, to indicate the number of downlink physical channels in the channel group scheduled by the current DCI. The first information in the first DCI is used to indicate the number of downlink physical channels included in the channel group 0.

In this way, when the number of downlink physical channels corresponding to channel group 0 is not provided in the second DCI, the terminal can obtain the number of downlink physical channels included in the channel group 0 through the first information in the first DCI. The terminal generates the feedback information codebook according to the number, even if the terminal does not receive the data transmitted by some downlink physical channels in the channel group 0, for example, the data transmitted on the downlink physical channel corresponding to $DAI_{g0}=7$ in FIG. 9, and the access network device and the terminal have the same understanding of the number of bits of the feedback information corresponding to the channel group 0.

As illustrated in FIG. 10, the terminal schedules the PUSCH transmission based on the first DCI. Since the transmission resource of the PUSCH overlaps the transmission resource of the PUCCH, the feedback information originally transmitted through the PUCCH is carried in the PUSCH for transmission.

In another possible implementation manner, the downlink physical channel used by the second DCI for scheduling or the downlink physical channel carrying the second DCI is contained in the second channel group, and the target channel group is the second channel group.

In the embodiment of the present disclosure, the first DCI is used to indicate the number of downlink physical channels included in the target channel group, so that when the terminal does not receive data transmitted by some downlink physical channels in the target channel group, the number of downlink physical channels included in the target channel group can be determined according to the first information. Therefore, it is ensured that the number of bits of the feedback information of the target channel group in the feedback information codebook is consistent with the understanding of the access network device, and the reliability of the feedback information is improved.

Figure 11:
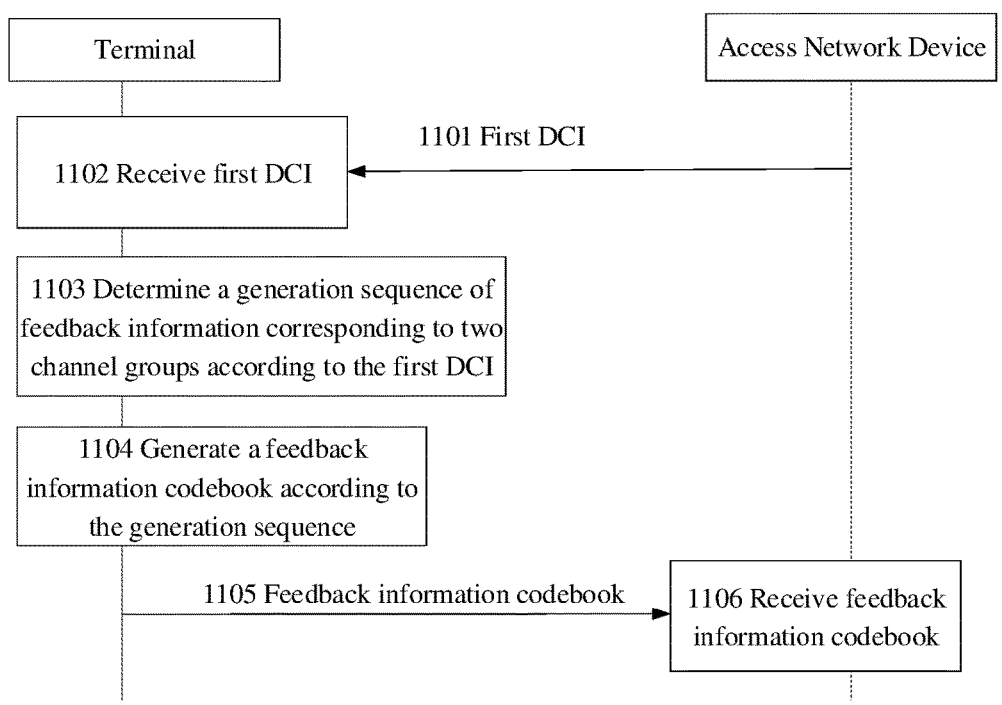
FIG. 11 is a flowchart of a transmission feedback information provided by an exemplary embodiment of the present application.

FIG. 11 illustrates a flowchart of a method for transmitting feedback information provided by an exemplary embodiment of the present application, which is applied to the terminal and access network device as illustrated in FIG. 2, as illustrated in FIG. 11, the method includes:

1101: The access network device transmits a first DCI.

A downlink physical channel scheduled by the first DCI or a channel carrying the first DCI is contained in a first channel group, and the first DCI is used to indicate the terminal to transmit feedback information corresponding to two channel groups.

1102: The terminal receives the first DCI.

1103: The terminal determines an order of feedback information corresponding to the two channel groups according to the first DCI.

1104: The terminal generates a feedback information codebook according to the order.

1105: The terminal transmits the feedback information codebook.

1106: The access network device receives the feedback information codebook.

The order of the feedback information in the feedback information codebook is determined by the terminal based on the first DCI.

In a possible implementation manner, in this step 1103, the two channel groups include a first channel group and a second channel group. The determined order is that, in the feedback information codebook, the feedback information corresponding to the second channel group appends to the feedback information corresponding to the first channel group.

In another possible implementation manner, in this step 1103, the two channel groups include a first channel group and a second channel group. If the first DCI includes the information of the second channel group, in the feedback information codebook, the feedback information corresponding to the first channel group appends to the feedback information corresponding to the second channel group.

Figure 12:
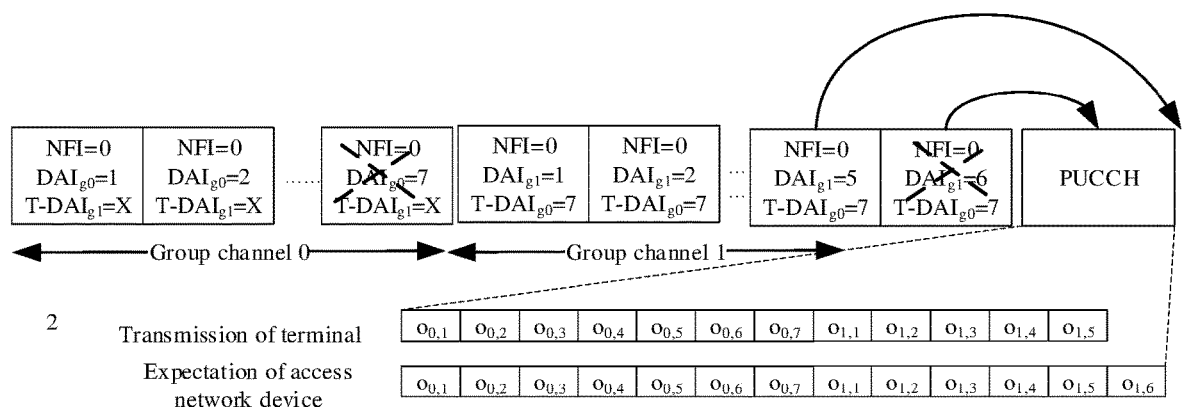
FIG. 12 is a schematic diagram of a feedback process of a feedback information provided by an exemplary embodiment of the present application.

Exemplarily, as illustrated in FIG. 12, the first DCI includes NFI and DAI information corresponding to the two channel groups, and the first DCI triggers the terminal to feed back the feedback information of the two channel groups, that is, the feedback information of the channel group 0 and the channel group 1. At this time, the terminal can obtain completely reliable NFI and DAI information of the channel group 0 and map the feedback information of the channel group 0 to the forefront of the entire feedback information codebook. When a base station is receiving, if the base station can detect that the terminal has lost part of the downlink physical channel (For example, demodulation is performed based on different numbers of feedback information bits, until the cyclic redundancy check (CRC) check is passed, that is, the demodulation is successful), the base station can ensure that the understanding of the feedback information in the feedback information codebook is completely unambiguous.

In another possible implementation manner, in this step 1103, if the first DCI does not include the information of the second channel group. Then, in the feedback information codebook, the feedback information corresponding to the second channel group appends to the feedback information corresponding to the first channel group.

Figure 13:
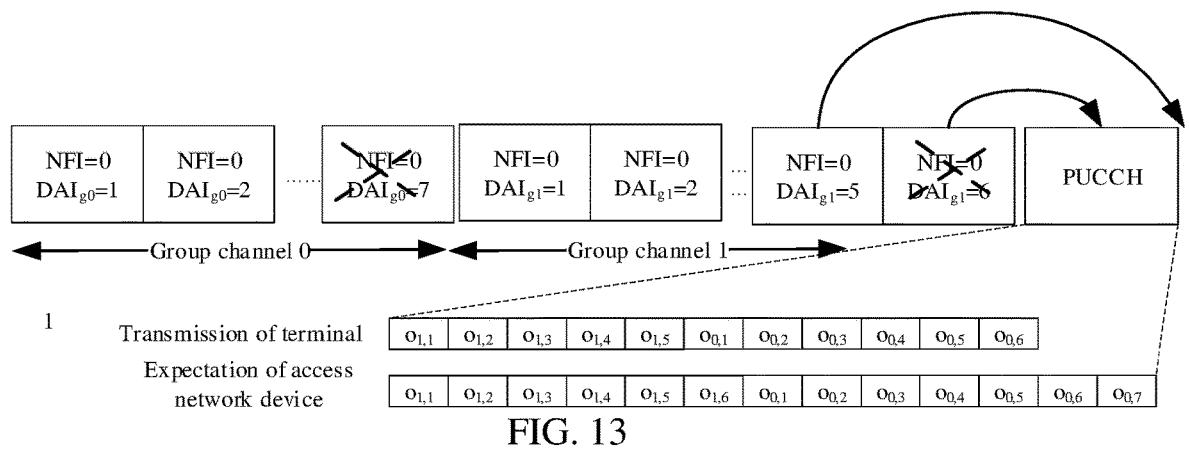
FIG. 13 is a schematic diagram of a feedback process of a feedback information provided by an exemplary embodiment of the present application.

As illustrated in FIG. 13, the first DCI only includes the NFI and DAI information corresponding to the channel group 1 scheduled by the first DCI, but the first DCI triggers the terminal to feed back the feedback information corresponding to the two channel groups, that is, triggers the terminal to feed back the channel group 0 and the channel group 1 corresponding the feedback information.

On the one hand, because the DAI information in the channel group 0 is cumulatively counted, that is, every time the data transmitted by the scheduled downlink physical channel is received, DAI is increased by 1, and DAI information of the data transmitted in the last scheduling downlink physical channel can correctly represent the actual scheduling situation. When the last PDSCH in the channel group 0 is lost (for example, the PDSCH corresponding to $DAI_{g0}=7$ in FIG. 12 is lost), the terminal and the access network device have inconsistent understanding of the number of downlink physical channels included in the channel group 0, resulting in inconsistent understanding of the number of bits of feedback information. On the other hand, if the terminal does not receive the downlink physical channel in channel group 0 at all, the terminal's understanding of NFI is also different from that of the access network device. Therefore, the terminal cannot obtain completely reliable NFI and DAI information of the channel group 0. In this case, the feedback information of the channel group 1 is mapped to the forefront of the entire feedback information codebook. When the access network device receives the feedback information codebook, if the access network device can detect that the terminal has lost part of the downlink physical channel (for example, demodulation is performed based on different feedback information bits until the CRC check is passed, that is, the demodulation is successful), then the access network device can be ensured that the understanding of the feedback information at the beginning of the feedback information codebook is correct. That is, the feedback information of the 1st to 5th bits in the figure.

Optionally, the information of the second channel group includes information for indicating the number of downlink physical channels included in the second channel group. Alternatively, the information of the second channel group is NFI and/or DAI information corresponding to the first channel group.

In the embodiment of the present disclosure, by determining the order of the feedback information according to the first DCI, it can be ensured that the access network device and the terminal have at least the same understanding of the feedback information in the initial part of the feedback information codebook. That is, it is possible to reduce or avoid the inconsistent understanding of the feedback information in the feedback information codebook by the access network device and the terminal.

Figure 14:
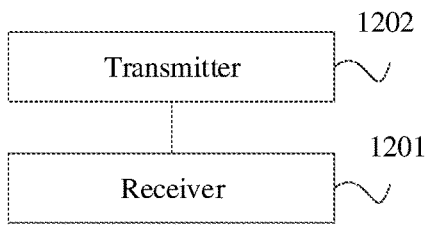
FIG. 14 is a schematic diagram of a device for transmitting a feedback information provided by an exemplary embodiment of the present application.

FIG. 14 is a schematic diagram of a device for transmitting feedback information provided by an exemplary embodiment of the present application. As illustrated in FIG. 14, the device includes: a receiver 1201 and a transmitter 1202.

The receiver 1201 is configured to receive a first downlink control information, wherein the first downlink control information comprises information of a downlink physical channel corresponding to a first channel group, the first downlink control information does not comprise information of a downlink physical channel corresponding to a second channel group, the first channel group comprises a downlink physical channel scheduled by the first downlink control information or a downlink physical channel carrying the first downlink control information, and the second channel group comprises a downlink physical channel scheduled by a second downlink control information or a downlink physical channel carrying the second downlink control information.

The transmitter 1202 transmits a feedback information codebook when the terminal is triggered to transmit a feedback information corresponding to at least two channel groups, and the feedback information codebook of a feedback information corresponding to all hybrid automatic repeat request (HARD) processes is supported by the terminal, or the feedback information codebook comprises a feedback information corresponding to the first channel group.

Optionally, the first downlink control information further comprises a feedback group trigger information, and the feedback group trigger information is used to indicate the terminal to transmit a feedback information corresponding to at least one channel group.

Optionally, if the feedback group trigger information is a first trigger information used to indicate the terminal to feed back the feedback information corresponding to the at least two channel groups, the transmitter 1202 transmits a first feedback information codebook, and the first feedback information codebook comprises a feedback information corresponding to all HARQ processes supported by the terminal.

Optionally, if the feedback group trigger information is a second trigger information used to indicate the terminal to feed back the feedback information corresponding to the first channel group, the transmitter 1202 transmits a second feedback information codebook, and the second feedback information codebook comprises the feedback information corresponding to the first channel group.

Optionally, if the first downlink control information does not comprise the feedback group trigger information, the transmitter 1202 transmits a second feedback information codebook, and the second feedback information codebook comprises a feedback information corresponding to a first channel group, and the feedback group trigger information is used to indicate the terminal to transmit a feedback information corresponding to at least one channel group.

Optionally, the first downlink control information does not comprise a feedback group trigger information field, the feedback group trigger information field is used to carry a feedback group trigger information, and the feedback group trigger information is used to indicate the terminal to transmit a feedback information corresponding to at least one channel group, or the first downlink control information comprises a feedback group trigger information field, the feedback group trigger information field is reserved, or the feedback group trigger information field is used to carry a non-feedback group trigger information.

Optionally, the non-feedback group trigger information comprises at least one of the following information: a physical channel priority information, an adjustment coding level table information, a coding block group (CBG) information, and information carried in other information fields except the feedback group trigger information field in the first downlink control information.

Optionally, the receiver 1201 is further to receive a first signaling, the first signaling is used to configure the terminal to support transmitting the feedback information of the at least two channel groups triggered by one downlink control information.

Optionally, the first signaling is used to indicate the first downlink control information comprising information of the downlink physical channel corresponding to the second channel group; or the first signaling is used to indicate the first downlink control information comprising the feedback group trigger information.

Optionally, the receiver 1201 is further to receive a second signaling, and the second signaling is used to configure the terminal to trigger transmitting of the feedback information corresponding to at least two channel groups through the first downlink control information.

Optionally, information of the downlink physical channel comprises a new feedback information and/or a downlink allocation index information.

Figure 15:
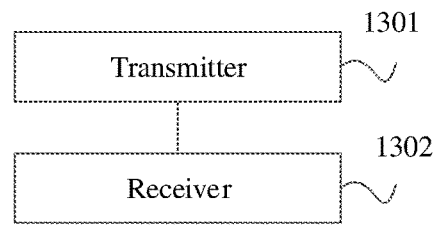
FIG. 15 is a schematic diagram of a device for receiving a feedback information provided by an exemplary embodiment of the present application.

FIG. 15 is a schematic diagram of a device for receiving feedback information provided by an exemplary embodiment of the present application. As illustrated in FIG. 15, the device includes: a transmitter 1301 and a receiver 1302.

The transmitter 1301 is configured to transmit a first downlink control information, wherein the first downlink control information comprises information of a downlink physical channel corresponding to a first channel group, the first downlink control information does not comprise information of a downlink physical channel corresponding to a second channel group, the first channel group comprises a downlink physical channel scheduled by the first downlink control information or a downlink physical channel carrying the first downlink control information, and the second channel group comprises a downlink physical channel scheduled by a second downlink control information or a downlink physical channel carrying the second downlink control information.

The receiver 1302 is configured to receive a feedback information codebook, wherein the feedback information codebook is transmitted when a terminal is triggered to transmit a feedback information corresponding to at least two channel groups, the feedback codebook information comprises a feedback information corresponding to all hybrid automatic repeat request (HARD) processes supported by the terminal, or the feedback information codebook comprises a feedback information corresponding to the first channel group.

Optionally, the first downlink control information further comprises a feedback group trigger information, and the feedback group trigger information is used to indicate the terminal to transmit a feedback information corresponding to at least one channel group.

Optionally, the receiver 1302 is configured to receive a first feedback information codebook, wherein the first feedback information codebook is that the terminal is triggered by a feedback group trigger information to transmit a feedback information corresponding to at least two channel groups, and the feedback group trigger information is transmitted when the terminal is used to indicate the terminal to feed back a first trigger information corresponding to the feedback information of the at least two channel groups.

Optionally, the receiver 1302 is further to receive a second feedback information codebook, the second feedback information codebook is transmitted when the feedback group trigger information is a second trigger information used to indicate the terminal to feed back a feedback information corresponding to a first channel group, and the second feedback information codebook comprises the feedback information corresponding to the first channel group.

Optionally, the receiver 1302 is further to receive a second feedback information codebook, the second feedback information codebook comprises a feedback information of a first channel group, and the second feedback information codebook is transmitted when the terminal does not comprise a feedback group trigger information in the first downlink control information.

Optionally, the first downlink control information does not comprise a feedback group trigger information field, the feedback group trigger information field is used to carry a feedback group trigger information, and the feedback group trigger information is used to indicate the terminal to transmit a feedback information corresponding to at least one channel group, or the first downlink control information comprises a feedback group trigger information field, the feedback group trigger information field is reserved, or the feedback group trigger information field is used to carry a non-feedback group trigger information.

Optionally, the non-feedback group trigger information comprises at least one of the following information: a physical channel priority information, an adjustment coding level table information, a coding block group (CBG) information, and information carried in other information fields except the feedback group trigger information field in the first downlink control information.

Optionally, the transmitter 1301 is further to transmit a first signaling, the first signaling is used to configure the terminal to support transmitting the feedback information of the at least two channel groups triggered by one downlink control information.

Optionally, the first signaling is used to indicate that the first downlink control information does not comprise information of the downlink physical channel corresponding to the second channel group; or the first signaling is used to indicate the first downlink control information comprising the feedback group trigger information.

Optionally, the transmitter 1301 is further to transmit a second signaling, and the second signaling is used to configure the terminal to trigger transmitting of the feedback information corresponding to at least two channel groups through the first downlink control information.

Optionally, information of the downlink physical channel comprises a new feedback information and/or a downlink allocation index information.

Figure 16:
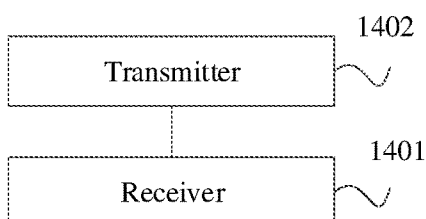
FIG. 16 is a schematic diagram of a device for transmitting a feedback information provided by an exemplary embodiment of the present application.

FIG. 16 is a schematic diagram of a device for transmitting feedback information provided by an exemplary embodiment of the present application. As illustrated in FIG. 16, the device includes: a receiver 1401 and a transmitter 1402.

The receiver 1401 is configured to receive a first downlink control information, wherein the first downlink control information is used to schedule a first uplink physical channel, the first downlink control information comprises a first information, and the first information is used to indicate a number of downlink physical channels included in a target channel group; and wherein the receiver is configured to receive a second downlink control information, the second downlink control information is used to indicate the terminal to transmit a feedback information corresponding to at least two channel groups, and the at least two channel groups comprise the target channel group.

The transmitter 1402 is configured to transmit the feedback information of the at least two channel groups, wherein a number of bits of a feedback information of the target channel group in the feedback information of the at least two channel groups is determined according to the first information.

Optionally, if a downlink physical channel scheduled by the second downlink control information or a downlink physical channel carrying the second downlink control information is contained in a second channel group, the second downlink control information comprises a second information used to indicate a number of downlink physical channels included in a first channel group, and the target channel group is the second channel group; or if the downlink physical channel scheduled by the second downlink control information or the downlink physical channel carrying the second downlink control information is contained in the second channel group, the second downlink control information does not comprise the second information used to indicate a number of downlink physical channels included in the first channel group, and the target channel group is the first channel group.

Optionally, the downlink physical channel scheduled by the second downlink control information or the downlink physical channel carrying the second downlink control information is contained in the second channel group, and the target channel group is the second channel group.

Optionally, the first information is a downlink allocation index (DAI) information. Optionally, the second information is a downlink allocation index (DAI) information.

Figure 17:
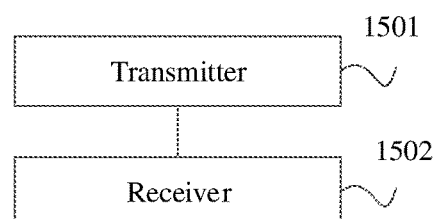
FIG. 17 is a schematic diagram of a device for receiving a feedback information provided by an exemplary embodiment of the present application.

FIG. 17 is a schematic diagram of a device for receiving feedback information provided by an exemplary embodiment of the present application. As illustrated in FIG. 17, the device includes: a transmitter 1501 and a receiver 1502.

The transmitter 1501 is configured to transmit a first downlink control information, wherein the first downlink control information is used to schedule a first uplink physical channel, the first downlink control information comprises a first information, and the first information is used to indicate a number of downlink physical channels included in a target channel group; wherein the transmitter is configured to transmit a second downlink control information, the second downlink control information is used to indicate a terminal to transmit a feedback information corresponding to at least two channel groups, and the at least two channel groups comprise the target channel group.

The receiver 1502 is configured to receive the feedback information of the at least two channel groups, wherein a number of bits of a feedback information of the target channel group in the feedback information of the at least two channel groups is determined according to the first information.

Optionally, if a downlink physical channel scheduled by the second downlink control information or a downlink physical channel carrying the second downlink control information is contained in a second channel group, the second downlink control information comprises a second information used to indicate a number of downlink physical channels included in a first channel group, and the target channel group is the second channel group; or if the downlink physical channel scheduled by the second downlink control information or the downlink physical channel carrying the second downlink control information is contained in the second channel group, the second downlink control information does not comprise the second information used to indicate a number of downlink physical channels included in the first channel group, and the target channel group is the first channel group.

Optionally, the downlink physical channel scheduled by the second downlink control information or the downlink physical channel carrying the second downlink control information is contained in the second channel group, and the target channel group is the second channel group.

Optionally, the first information is a downlink allocation index (DAI) information.

Optionally, the second information is a downlink allocation index (DAI) information.

Figure 18:
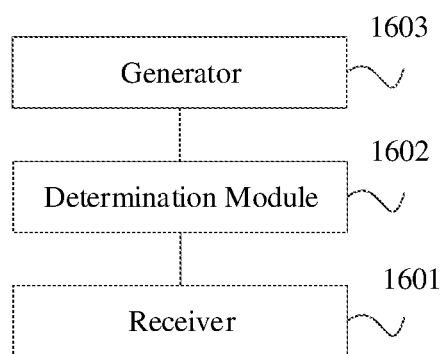
FIG. 18 is a schematic diagram of a device for generating a feedback information provided by an exemplary embodiment of the present application.

FIG. 18 is a schematic diagram of a device for generating feedback information provided by an exemplary embodiment of the present application. As illustrated in FIG. 18, the device includes: a receiver 1601, a determination module 1602, and a generator 1603.

The receiver 1601 is configured to receive a first downlink control information, wherein a downlink physical channel scheduled by the first downlink control information or a channel carrying the first downlink control information is contained in a first channel group, and the first downlink control information is used to indicate the terminal to transmit a feedback information corresponding to two channel groups.

The determination module 1602 is configured to determine an order of the feedback information corresponding to the two channel groups according to the first downlink control information.

The generator is configured to generate a feedback information codebook according to the order.

Optionally, the two channel groups comprise the first channel group and a second channel group, in the feedback information codebook, the feedback information corresponding to the second channel group appends to the feedback information corresponding to the first channel group.

Optionally, the two channel groups comprise the first channel group and the second channel group, if the first downlink control information comprises information of the second channel group, in the feedback information codebook, the feedback information corresponding to the first channel group appends to the feedback information corresponding to the second channel group; or if the first downlink control information does not comprise the information of the second channel group, in the feedback information codebook, the feedback information corresponding to the second channel group appends to the feedback information corresponding to the first channel group.

Optionally, the information of the second channel group comprises information used to indicate a number of downlink physical channels included in the second channel group; or the information the second channel group is a new feedback indication information and/or a downlink allocation index (DAI) information corresponding to the first channel group.

Figure 19:
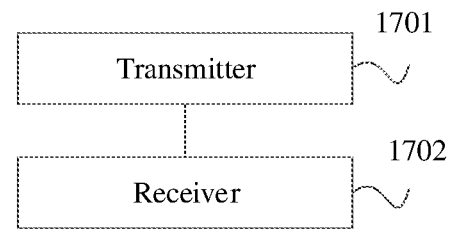
FIG. 19 is a schematic diagram of a device for receiving a feedback information provided by an exemplary embodiment of the present application.

FIG. 19 is a schematic diagram of a device for receiving feedback information provided by an exemplary embodiment of the present application. As illustrated in FIG. 19, the device includes: a transmitter 1701 and a receiver 1702.

The transmitter 1701 is configured to transmit a first downlink control information, wherein a downlink physical channel scheduled by the first downlink control information or a channel carrying the first downlink control information is contained in a first channel group, and the first downlink control information is used to indicate a terminal to transmit a feedback information corresponding to two channel groups.

The receiver 1702 is configured to receive a feedback information codebook, wherein an order of the feedback information in the feedback information codebook is determined by the terminal according to the first downlink control information.

Optionally, the two channel groups comprise the first channel group and a second channel group, in the feedback information codebook, the feedback information corresponding to the second channel group appends to the feedback information corresponding to the first channel group.

Optionally, the two channel groups comprise the first channel group and the second channel group, if the first downlink control information comprises information of the second channel group, in the feedback information codebook, the feedback information corresponding to the first channel group appends to the feedback information corresponding to the second channel group; or if the first downlink control information does not comprise the information of the second channel group, in the feedback information codebook, the feedback information corresponding to the second channel group appends to the feedback information corresponding to the first channel group.

Optionally, the information of the second channel group comprises information used to indicate a number of downlink physical channels included in the second channel group; or the information the second channel group is a new feedback indication information and/or a downlink allocation index (DAI) information corresponding to the first channel group.

Figure 20:
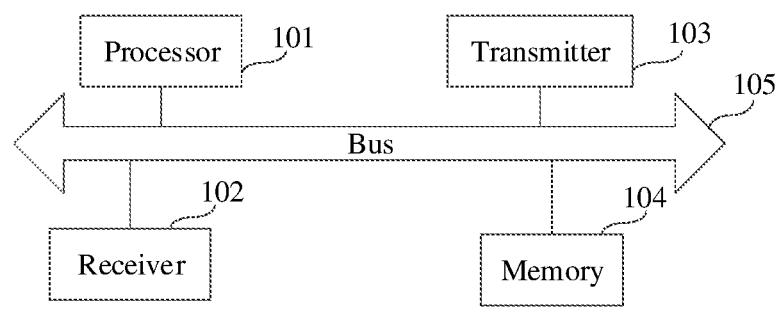
FIG. 20 is a schematic structural diagram of a communication device provided by an exemplary embodiment of the present application.

FIG. 20 illustrates a schematic structural diagram of a communication device (terminal or access network device) provided by an exemplary embodiment of the present application. The communication device includes: a processor 101, a receiver 102, a transmitter 103, a memory 104, and a bus 105.

The processor 101 includes one or more processing cores, and the processor 101 executes various functional applications and information processing by running software programs and modules.

The receiver 102 and the transmitter 103 may be implemented as a communication component, and the communication component may be a communication chip.

The memory 104 is connected to the processor 101 through the bus 105.

The memory 104 may be used to store at least one indication, and the processor 101 is used to execute the at least one indication to implement each step in the foregoing method embodiments.

In addition, the memory 114 may be implemented by a volatile or non-volatile storage device of any type or a combination thereof. The volatile or non-volatile storage device includes but is not limited to: a magnetic disk or an optical disc, an electrically erasable programmable read-only memory (EEPROM), an erasable programmable read only memory (EPROM), a static random access memory (SRAM), a read-only memory (ROM), a magnetic memory, a flash memory, or a programmable read-only memory (PROM).

In an exemplary embodiment, a computer-readable storage medium is also provided. The computer-readable storage medium stores at least one indication, at least one program, a code set, or an indication set, and the at least one indication, the at least one program, the code set, or the indication set is loaded and executed by the processor to implement the method for transmitting the feedback information or the method for receiving the feedback information performed by the communication device provided in the foregoing method embodiments.

Those of ordinary skill in the art can understand that all or part of the steps in the foregoing embodiments can be implemented by a hardware, or by a program to indicate the relevant hardware. The program can be stored in a computer-readable storage medium. The storage medium mentioned can be a read-only memory, a magnetic disk, or an optical disk, etc.

The foregoing descriptions are only optional embodiments of the present application and are not intended to limit the present application. Any modification, equivalent replacement, improvement, etc. made within the spirit and principle of the present application shall be included in the protection scope of the present application.

What is claimed is:

1. A method for generating feedback information, applied to a terminal, comprising:
receiving a first downlink control information, wherein a downlink physical channel scheduled by the first downlink control information is contained in a first channel group, and the first downlink control information is used to indicate the terminal to transmit a feedback information corresponding to two channel groups; and
determining an order of the feedback information corresponding to the two channel groups in a feedback information codebook according to the first downlink control information,
wherein the two channel groups comprise the first channel group and a second channel group,
wherein if the first downlink control information comprises information of the second channel group, in the feedback information codebook, the feedback information corresponding to the first channel group appends to the feedback information corresponding to the second channel group,
wherein if the first downlink control information does not comprise the information of the second channel group, in the feedback information codebook, the feedback information corresponding to the second channel group appends to the feedback information corresponding to the first channel group.

2. The method according to claim 1, further comprising receiving a first signaling, where the first signaling is used to indicate that the first downlink control information comprises a feedback group trigger information.

3. The method according to claim 2, wherein the first signaling is further used to indicate whether the first downlink control information comprises a new feedback information (NFI) corresponding to the second channel group.

4. The method according to claim 1, wherein the information of the second channel group comprises information used to indicate a number of downlink physical channels included in the second channel group; or the information of the second channel group is a new feedback indication information and/or a downlink allocation index (DAI) information corresponding to the first channel group.

5. A method for receiving feedback information, applied to an access network device, comprising:
transmitting a first downlink control information, wherein a downlink physical channel scheduled by the first downlink control information is contained in a first channel group, and the first downlink control information is used to indicate a terminal to transmit a feedback information corresponding to two channel groups; and
receiving a feedback information codebook, wherein an order of the feedback information corresponding to the two channel groups in the feedback information codebook is determined by the terminal according to the first downlink control information,
wherein the two channel groups comprise the first channel group and a second channel group,
wherein if the first downlink control information comprises information of the second channel group, in the feedback information codebook, the feedback information corresponding to the first channel group appends to the feedback information corresponding to the second channel group,
wherein if the first downlink control information does not comprise the information of the second channel group, in the feedback information codebook, the feedback information corresponding to the second channel group appends to the feedback information corresponding to the first channel group.

6. The method according to claim 5, further comprising transmitting a first signaling to a terminal, where the first signaling is used to indicate that the first downlink control information comprises a feedback group trigger information.

7. The method according to claim 6, wherein the first signaling is further used to indicate whether the first downlink control information comprises a new feedback information (NFI) corresponding to the second channel group.

8. The method according to claim 5, wherein the information of the second channel group comprises information used to indicate a number of downlink physical channels included in the second channel group; or the information of the second channel group is a new feedback indication information and/or a downlink allocation index (DAI) information corresponding to the first channel group.

9. A device for generating feedback information, comprising a memory, storing instructions; and a processor coupled to the memory, configured to execute the instructions stored in the memory to:
receive a first downlink control information, wherein a downlink physical channel scheduled by the first downlink control information is contained in a first channel group, and the first downlink control information is used to indicate the terminal to transmit a feedback information corresponding to two channel groups; and
determine an order of the feedback information corresponding to the two channel groups in a feedback information codebook according to the first downlink control information,
wherein the two channel groups comprise the first channel group and a second channel group,
wherein if the first downlink control information comprises information of the second channel group, in the feedback information codebook, the feedback information corresponding to the first channel group appends to the feedback information corresponding to the second channel group,
wherein if the first downlink control information does not comprise the information of the second channel group, in the feedback information codebook, the feedback information corresponding to the second channel group appends to the feedback information corresponding to the first channel group.

10. The device according to claim 9, wherein the processor is further configured to receive a first signaling, where the first signaling is used to indicate that the first downlink control information comprises a feedback group trigger information.

11. The device according to claim 10, wherein the first signaling is further used to indicate whether the first downlink control information comprises a new feedback information NFI corresponding to the second channel group.

12. The device according to claim 9, wherein the information of the second channel group comprises information used to indicate a number of downlink physical channels included in the second channel group; or the information of the second channel group is a new feedback indication information and/or a downlink allocation index (DAI) information corresponding to the first channel group.

\* \* \* \* \*